Aug. 15, 1967  TOSHIO HAYASHI  3,335,695
DEVICE FOR INDICATING PRESENCE OR ABSENCE OF FILMS IN CAMERAS
Filed Sept. 9, 1966

United States Patent Office 3,335,695
Patented Aug. 15, 1967

3,335,695
DEVICE FOR INDICATING PRESENCE OR
ABSENCE OF FILMS IN CAMERAS
Toshio Hayashi, Sakai, Japan, assignor to Minolta Camera
Kabushiki Kaisha, Osaka, Japan, corporation of Japan
Filed Sept. 9, 1966, Ser. No. 578,355
2 Claims. (Cl. 116—114)

ABSTRACT OF THE DISCLOSURE

A film footage and presence indicating mechanism for roll film cameras having a takeup spool wherein the spool is fashioned with a circumferential groove at the spool end corresponding to the cut-out portion of the film lead and into which is received a film contact portion of a lever when the cut-out film lead portion uncovers the groove and when no film is loaded in the camera. The lever is mechanically connected to an indicating lever visible through a window provided in the camera casing, the indicating lever being arcuately moved as the film contact portion of the said lever moves responsive to change in diameter of the film on the takeup spool. As the lead of the film is needed from the takeup spool to the supply spool, the cutout portion of the lead passes beneath the film contact portion of the lever before the lead end of the film is reached, and the contact portion is secured into the spool groove with the indicating lever thus moved in the window to warn the operator that the end of the film is approaching whereby the lead end will not be rewound into the supply spool case.

---

The present invention relates to a roll film footage indicator for visibly indicating the presence or absence of film in a camera and approximately the film footage used or remaining, and more particularly to an indicator quite simple in construction wherein the presence or absence of film can be detected by means of a pivotal lever arranged to ride at one end on the film wound around the take-up spool.

Heretofore, in order to detect whether a camera was loaded with film or not, various devices were proposed and actually used, but have been found complex in construction without the attainment of rapid and exact detection of film loaded in the camera.

A principal object of the present invention is, to provide a device simple in construction for indicating film presence or absence in a camera. The device according to the present invention is constructed such that pivotal movement is imparted to a lever directly riding or urging on a 35 mm. roll film as it is wound on a takeup spool charged in the camera. An indicating lever visible through a window in the camera wall is actuated by the first mentioned lever whereby it is possible to detect directly and exactly the presence or absence of film from outside the camera by means of a simple mechanism.

Another object is to provide a film counter for indicating approximately the number of frames of film photographed or unphotographed by means of the angular position of an indicating lever which varies in position according to the amount of film reeled around the takeup spool.

A further object is the provision of a film presence indicator for cameras which is actuated to a "no film" indication upon rewind of film from the takeup spool to the film magazine or roll spool housing whereby the lead end of the film may be stopped prior to complete rewind of the film lead into the magazine or roll spool housing.

Other objects and advantages of the present invention will be apparent from the following description when read in conjunction with the accompanying drawing, in which.

Figure 1:
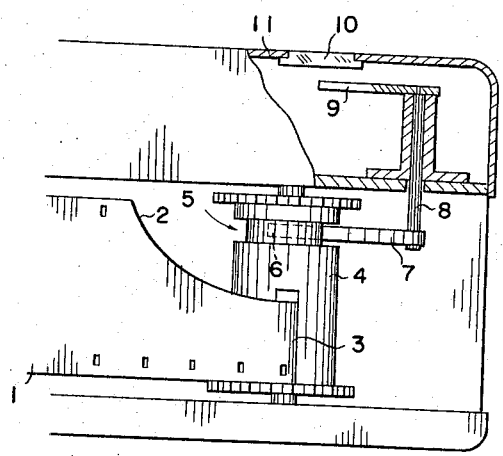
FIG. 1 is a front view partly in section with parts broken away of the present invention.
Figure 2:
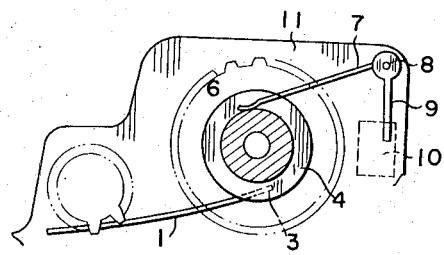
FIG. 2 is a plan view, partly in section, of the invention illustrating a takeup spool with film fed thereto by a film advancing sprocket, the view being oriented 90° with respect to that plan view, partly in section, oriented.
Figure 3:
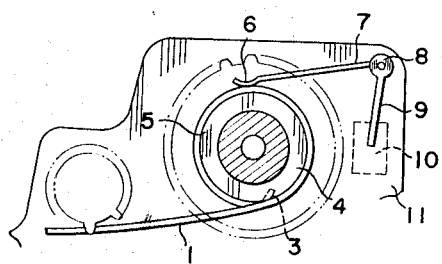
FIG. 3 is similar to FIG. 2 with film wound on a takeup spool and a feeler or lever riding thereon.

Referring now to the drawings, FIG. 1 denotes a film and a takeup spool 4 mounted within a camera. An operating lever 7 is provided with a curved contact portion 6 at the free end thereof. The leading end portion 3 of the film is shown in FIG. 1 with the usual cut-off root portion 2 along one side edge thereof and the leading end portion 3 of the film is inserted in the spool 4 for takeup of the film as best shown in FIG. 1. An annular groove 5 is formed in the takeup spool between the spool arbor and the spool flange on the same side as the film root portion 2 is formed. As shown in FIGS 2 and 3, the curved contact portion 6 of the operating lever 7 is secured to one end of a spindle 8. The lever contact portion 6, or follower, is urged in contact with the bottom of said annular groove 5 when no film is on the takeup spool 4. The operating lever 7 turns spindle 8 fixed thereto, and an indicating lever 9 is secured to the other end of spindle 8 so that when the lever 7 is angularly moved clockwise, the lever 9 may be angularly moved clockwise also as can be readily appreciated as depicted in FIGS. 2 and 3. The deviation of angular position of the indicating lever 9 may be observed through a window 10 provided on the side wall of the camera casing 11.

According to the above-mentioned construction, when the leading end 3 of film 1 is inserted in the slot of the take-up spool 4 for receiving the film from the supply spool within a housing, the curved contact portion 6 of operating lever 7 abutting the circumferential surface of the annular groove 5 is lifted by the film cut-off root portion 2. The lifting or rotation of the operating lever 7 and spindle 8 causes the free end of the indicator lever 9 to be angularly moved in the window 10, which shows clearly the location of film. It is preferable to bias the lever 7 so as to normally contact the film wound on the take-up spool by means of spring (not shown).

During the film take-up period which extends until the final photographing is completed the curved contact portion 6 of operating lever 7 rides on the film 1, and the indicator lever 9 can be observed through the window opening 10 to show the presence of film loaded in the camera. However, the contact portion 6 is biased to return to a position in the bottom of annular groove 5 formed in the take-up spool 4 as the cut off base or root portion 2 of lead end 3 passes the portion 6 during the rewinding operation, thus signalling via lever 9 the completion of rewind. That is the indicating lever 9 attached coaxially with the operating lever 7 is returned to the original position to inform the absence of film loaded in the camera.

What is claimed is:

1. A film footage and presence indicating mechanism for roll-film cameras comprising
    a takeup spool having a circumferential groove axially located to correspond with the cutout portion of a roll film lead as it is threaded on the spool,
    a window provided in a wall of the camera, and lever means with a film contact portion received within the groove when the lead cutout portion exposes the groove to the contact portion and when no film is loaded in the camera said film lifting the lever contact portion from the groove as the cutout portion of the lead is wound onto the takeup spool and film is brought between the contact portion and the groove, the lever means being moved responsive to change of diameter of film wound on said takeup spool by arcuate movements of the film contact portion upon the film on said takeup spool, and said movement being observable through said window.

2. An indicating mechanism as recited in claim 1 wherein the lever means includes an operating lever with a film contact portion thereon, an indicating lever with a portion visible through said window, and a pivot supported by the camera joining the mentioned levers for arcuate movement in unison as the diameter of film on the takeup spool changes.

References Cited
UNITED STATES PATENTS

| | | | |
|---|---|---|---|
| 2,624,306 | 1/1953 | Hatke | 116—67 |
| 2,987,956 | 6/1961 | Plahert et al. | 352—172 |
| 3,016,620 | 1/1962 | Wittel et al. | 352—172 |

LOUIS J. CAPOZI, *Primary Examiner.*